United States Patent [19]

Maeda

[11] Patent Number: 4,619,353

[45] Date of Patent: Oct. 28, 1986

[54] CLUTCH COVER ASSEMBLY

[75] Inventor: Shigeho Maeda, Neyagawa, Japan

[73] Assignee: Kabushiki Kaisha Daikin Seisakusho, Osaka, Japan

[21] Appl. No.: 703,555

[22] Filed: Feb. 20, 1985

[30] Foreign Application Priority Data

Feb. 28, 1984 [JP] Japan .............................. 59-28795[U]

[51] Int. Cl.$^4$ ............................................. F16D 13/44
[52] U.S. Cl. ................................................. 192/70.18
[58] Field of Search ............ 192/70.18, 109 A, 109 B

[56] References Cited

U.S. PATENT DOCUMENTS

| | | | |
|---|---|---|---|
| 2,436,817 | 3/1948 | Miller | 192/109 A |
| 3,010,555 | 11/1961 | Garmager | 192/109 A |
| 4,095,683 | 6/1978 | Ban | 192/109 A |
| 4,114,740 | 9/1978 | Sugiura et al. | 192/70.18 |

Primary Examiner—George H. Krizmanich
Attorney, Agent, or Firm—Burns, Doane, Swecker & Mathis

[57] ABSTRACT

A clutch cover assembly has an annular pressure plate; a forcing device for forcing the pressure plate toward a clutch disc; and a connecting device connecting the pressure so as to be unrotatable but axially movable relative to a clutch cover. The pressure plate is divided into (a) a support member positioned adjacent to the clutch cover and connected to the forcing device and (b) a pressure member positioned adjacent to the clutch disc for pressing the clutch disc. Both of the support and pressure members are unrotatably and axially elastically connected by an elastic device so that an axial clearance may be formed between both members when the clutch is released.

3 Claims, 6 Drawing Figures ary plate 13 is divided into two members 15 and 16 as stated above, the pressure member 15 can be small and light, so that a controllability of the pressure member 15 by the strap plates 21 can be improved to provide an improved cushioning effect.

CLUTCH COVER ASSEMBLY

BACKGROUND AND SUMMARY OF THE INVENTION

The present invention relates to a clutch cover assembly employed in a friction clutch for an automobile, an industrial machine and others.

Conventionally, a clutch cover assembly itself does not have a cushioning characteristic for an engaging operations of the clutch. In order to absorb a shock an improve the sensation of engagement during the engaging operation, the conventional friction clutch is provided with cushioning plates in a clutch disc to which a friction facing is fixed. Further, the friction facing itself is made from organic material which gives the cushioning characteristic.

However, in recent years, some of the clutches have employed clutch discs without the cushioning effect, in which a combinations of metal and ceramics are used as the friction facings or in which the facings are directly fixed to rigid plates of the clutch disc assemblies.

Therefore, it has been desired to provide a structure in which a cushioning effect can be obtained during the engaging operation even in the clutch having a clutch disc assembly without the cushioning effect or characteristic.

Accordingly, it is an object of the invention to provide a clutch cover assembly having a simple structure and including a pressure plate, the clutch cover assembly being improved to provide a cushioning effect when pressing a friction facing onto a flywheel.

According to the invention, a clutch cover assembly comprises an annular pressure plate; a forcing means for forcing the pressure plate toward a clutch disc; and a connecting means connecting the pressure plate unrotatably and axially movably to a clutch cover; wherein the pressure plate is divided into (a) support member positioned adjacent to the clutch cover and connected to the forcing means and (b) a pressure member unrotatably connected to the support member and positioned adjacent to the clutch disc for pressing the clutch disc; and wherein both of the support and pressure members are unrotatably and axially elastically connected by an elastic means so that an axial clearance may be formed between both members in the released condition of the clutch.

Other and further objects, features and advantages of the invention will appear more fully from the following description of the preferred embodiments of the invention.

DETAILED DESCRIPTION OF THE PREFERRED EMBODIMENTS

Figure 1:
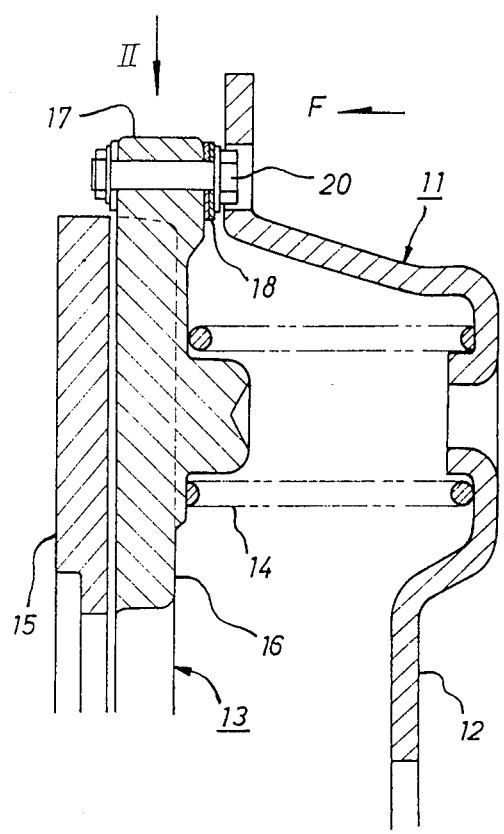
FIG. 1 is a fragmentary sectional view of a clutch cover assembly of an embodiment of the invention.

Referring to FIG. 1, a clutch cover assembly 11 comprises an annular clutch cover 12 coaxial to a center line 0-0. The outer peripheral portion of the cover 12 is adapted to be fixed to a flywheel (not shown) of an engine. The cover 12 is disposed at the rear of an annular pressure plate 13. Compressible coil springs 14 (only one is illustrated) parallel to the center line 0-0 are disposed between the clutch cover 12 and the pressure plate 13 so as to force the pressure plate 13 in a forward direction indicated by an arrow F. The pressure plate 13 comprises an annular pressure member 15 and a support member 16. The pressure member 15 is adapted to contact and press a friction facing (not shown) of a clutch disc onto the flywheel. The support member 16 is forced at the rear surface thereof by the coil springs 14. The support member 16 is integrally provided at the outer periphery with equally spaced projections or bosses 17 equally spaced in the circumferential direction.

Figure 2:
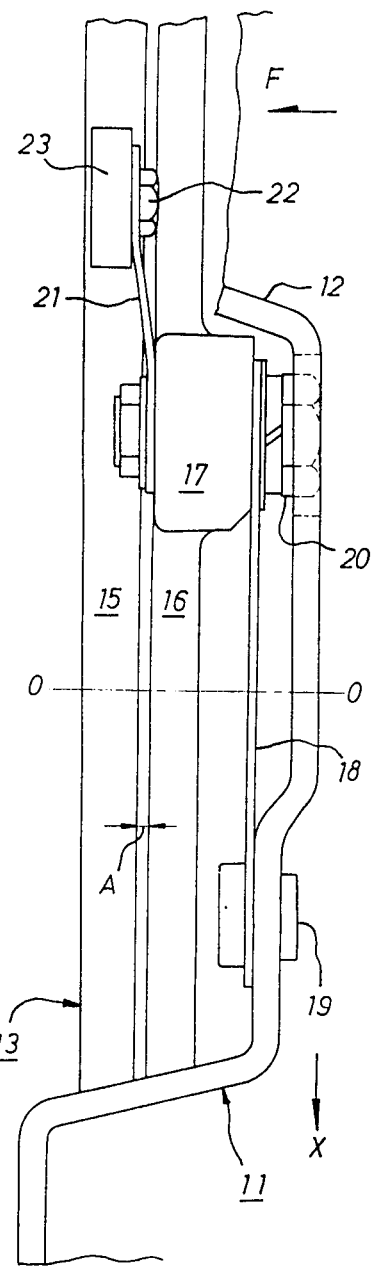
FIG. 2 is a fragmentary plan view of an assembly viewed in a direction of an arrow II in FIG. 1.

As shown in FIG. 2, belt-like strap plates 18 and 21 circumferentially connect the cover 12, support the member 16 and the pressure member 15. Strap plates 18, 21 are positioned to substantially extend in a circumferential direction of the cover 12. Although, the plates 18 and 21 fixedly connect the pressure member 15 and the support member 16 in the circumferential direction, the members 15 and 16 can move in the axial direction in accordance with the elastic deformation of the plates 18 and 21. In the rotating direction X of the clutch, the forward end of the strap plate 18 is fixed to the clutch cover 12 by a rivet 19, while the rear end of the plate 18 is fixed to the rear surface of the boss 17 by a bolt 20. In the rotating direction X, the forward end of the strap plate 21 is fixed to the front surface of the boss 17 by above bolt 20, and the rear end of the strap plate 21 is fixed by a bolt 22 to a rear surface of a boss 23 integrally formed at the outer periphery of the pressure member 15. In the disengaged or released condition illustrated in FIG. 2, an axial clearance A is formed between the pressure member 15 and the support member 16.

Figure 3:
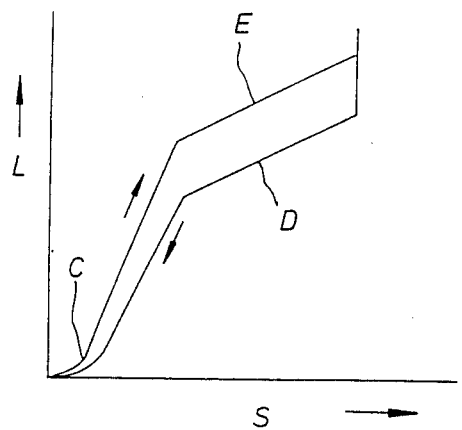
FIG. 3 is a graph explaining a relationship between a stroke and a load.

A typical operation is as follows. In order to engage the clutch, an operation lever or the like (not shown) is released, so that the pressure plate 13 is moved by the springs 14 in the forward direction F while elastically deforming the strap plates 18 and 21. As this occurs, the pressure member 15 presses the friction facing of the clutch disc assembly against the flywheel, and thus, the clutch engages. In this operation, the strap plates 21 between the members 15 and 16 are axially compressed through an axial distance corresponding to the clearance A, so that an axial cushioning effect is obtained. A line E in FIG. 3 indicates a relationship in this operation between a stroke S parallel to the center line 0-0 of the pressure plate 13 and a load L applied to the clutch disc assembly by the pressure member 15.

When the pressure plate 13 moves in a direction opposite to the arrow F, the engaged clutch is released. A line D in FIG. 3 indicates a relationship in this releasing operation between the stroke S and the load D. In this operation, the cushioning effect is also advantageously obtained by the strap plates 18, 21 immediately before the pressure member 15 is spaced from the facing.

According to the invention, as stated hereinbefore, the pressure plate 13 is divided into the pressure member 15 and the support member 16, which are axially and elastically connected by the elastic means such as the strap plates 21. Therefore, the cushioning effect can be obtained in the engaging and releasing operation, which improves the the sensation of clutch engagement during operation. Further, the clutch cover assembly can be simple in its structure. Moreover, since the pressure member 15 is separate from the support member 16, only the pressure member 15 needs to be replaced, when it is worn after a long use. Therefore, the the maintenance or repair cost is reduced.

The present invention may be modified as follows.

Figure 4:
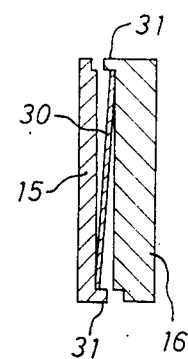
FIGS 4, 5 and 6 are fragmentary sectional view of respectively different embodiments of the invention.

(a) As shown in FIG. 4, a truncated conical spring 30 may be disposed coaxially to the center line 0-0 (FIG. 1) between the pressure member 15 and the support member 16. In this case, the members 15 and 16 are preferably provided with integral cylindrical protrusions or flanges 31 for coaxially positioning the conical spring 30. An annular wave spring may be employed instead of the conical spring 30.

Figure 5:
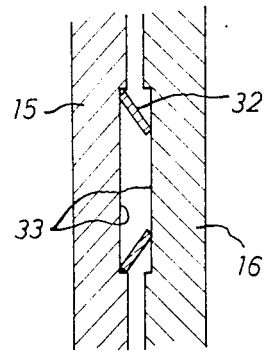
Figure 6:
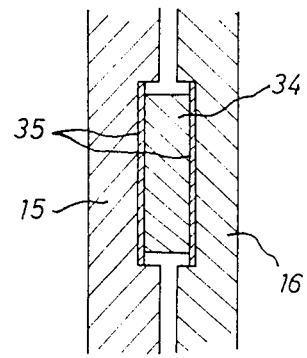

(b) As shown in FIG. 5, a plurality of truncated conical springs 32 having small diameters and radially spaced may be disposed between the pressure member 15 and the support member 16. In this case, the members 15 and 16 are preferably provided with circular hollows 33 which seat and position the springs 32.

(c) Instead of the conical spring 32, rubber members 34 or other elastic members may be employed. In this case, heat insulators 35 are preferably disposed between the member 15, the rubber members 34 and the member 16 for improving the heat resistance of the rubbers 34.

(d) One or more rubber members may be adhered and fixed to the members 15 and 16, in which case the strap plate 21 in FIG. 2 can be eliminated.

(e) Moreover, since the pressure plate 13 is divided into the pressure member 15 and the support member 16, the members 15 and 16 can be made from different materials. Therefore, the support member 16 can be made of sheet metal formed by press working or made from an aluminium or other light materials so as to reduce weight.

(f) Of course, the present invention may be employed in a clutch employing a diaphragm spring instead of the coil springs 14.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A clutch cover assembly comprising:
    a clutch cover adapted to be fixed to a flywheel and to cover a rear of a clutch disc;
    an annular pressure plate disposed between the clutch cover and the clutch disc;
    a forcing means for forcing the pressure plate toward the clutch disc;
    a connecting means connecting the pressure plate unrotatably and axially movably to the clutch cover;
    releasing means for moving said pressure plate away from the clutch disc toward the clutch cover; and
    the pressure plate having
        an annular support member positioned adjacent to the clutch cover, connected to the forcing means and having an outer periphery and bosses projecting radially outwardly from that outer periphery,
        a pressure member positioned adjacent to the clutch disc for pressing the clutch disc, and having on outer periphery and bosses projecting radially outwardly from that periphery, and
        elastic strap plates unrotatably and elastically connecting the bosses of the support member and the bosses of the pressure member, and being positioned beyond the outer peripheries of the support member and the pressure member so that an axial clearance may be formed between both members in the released condition of the clutch disc.

2. A clutch cover assembly of claim 1 wherein said elastic strap plate is elongated substantially in the circumferential direction of the clutch disc.

3. A clutch cover assembly of claim 2 wherein the forward end of the strap in the rotating direction of the clutch disc is fixed to a surface of the projection of the support member by an axial bolt, the rear end of the strap plate is fixed to a surface of the projection of the pressure member by an axial bolt, said connecting means is formed by a member extending substantially in the circumferential direction of the clutch disc, a forward end of the connecting member is fixed to the clutch cover, and the rear end of the connecting member is fixed to the projection of the support member by said bolt for fixing said strap to the projection of the support means.

* * * * *